United States Patent [19]

Pennino

[11] Patent Number: 5,657,853
[45] Date of Patent: Aug. 19, 1997

[54] BELT CONVEYORS HAVING CLEANING ROLLERS

[75] Inventor: Frank Pennino, Farmingdale, N.Y.

[73] Assignee: Pari Industries, Inc., Jamaica, N.Y.

[21] Appl. No.: 372,307

[22] Filed: Jan. 13, 1995

Related U.S. Application Data

[63] Continuation-in-part of Ser. No. 297,128, Aug. 29, 1994, abandoned.

[51] Int. Cl.⁶ ........................................... B65G 45/10
[52] U.S. Cl. ..................... 198/499; 198/498; 15/256.52
[58] Field of Search ........................... 198/497, 498, 198/499; 15/256.52; 384/495, 498

[56] References Cited

U.S. PATENT DOCUMENTS

| | | | |
|---|---|---|---|
| 1,889,174 | 11/1932 | Drexler | 384/495 X |
| 2,278,363 | 3/1942 | Broshkevitch | 384/495 |
| 2,397,164 | 3/1946 | Shafer | 384/495 |
| 2,652,920 | 9/1953 | Bowman . | |
| 2,695,200 | 11/1954 | Stanley | 384/495 |
| 3,101,837 | 8/1963 | Martin | 198/499 |
| 3,212,631 | 10/1965 | Thompson | 198/498 X |
| 3,583,555 | 6/1971 | Karsnak et al. . | |
| 3,994,385 | 11/1976 | Reiter | 198/499 |
| 4,025,135 | 5/1977 | Hishida | 384/498 |
| 4,249,650 | 2/1981 | Stahura | 198/499 |
| 4,365,706 | 12/1982 | Bright | 198/499 |
| 4,428,090 | 1/1984 | Coggin et al. | 198/499 X |
| 4,668,110 | 5/1987 | Egetö et al. | 384/498 X |
| 4,795,024 | 1/1989 | Eatwell | 198/499 |
| 5,161,666 | 11/1992 | Pope . | |
| 5,328,276 | 7/1994 | Linteau | 384/495 X |
| 5,339,947 | 8/1994 | Campanile | 198/499 |

FOREIGN PATENT DOCUMENTS

| | | | |
|---|---|---|---|
| 0013327 | 1/1989 | Japan | 198/497 |
| 0221013 | 9/1990 | Japan | 198/498 |
| 2042454 | 9/1980 | United Kingdom | 198/499 |
| 2055730 | 3/1981 | United Kingdom | 198/499 |
| 9110609 | 7/1991 | WIPO | 198/497 |

*Primary Examiner*—James W. Keenan

[57] ABSTRACT

The disclosed conveyor-belt cleaning assembly includes a ribbed cleaning roller that is restrained by a blocking device against moving closer to the belt than an operating position at which the ribs of the cleaning roller sweep at high speed along or close to the belt, while spring bias acting on the cleaning roller firmly but yieldably biases the cleaning roller toward the blocking device. The spring bias and the blocking device are adjustable independently of each other so that the operating position can be adjusted to compensate for wear of the ribs while the spring bias remains unchanged. The cleaning roller is supported by composite spherical/rotary bearings that allow the roller to tilt. A hole in a frame plate accommodates removal and insertion of the cleaning roller lengthwise without disassembling the frame plate when the cleaning roller is to be replaced.

16 Claims, 3 Drawing Sheets

BELT CONVEYORS HAVING CLEANING ROLLERS

This is a continuation-in-part of application Ser. No. 08/207,128 filed Aug. 29, 1994, now abandoned.

The present invention relates to belt conveyors equipped with cleaning rollers and to a method of cleaning conveyor belts.

BACKGROUND

Belt conveyors are used for transporting a wide range of materials, such as coal, limestone and ore. Some of the material carried by the material-conveying stretch of the belt sticks to the belt. The return stretch of the belt is commonly equipped with a belt cleaner, to remove the stuck material.

One highly effective belt cleaner is a ribbed roller; the roller is driven at a speed such that the ribs of the roller act somewhat as scrapers; the roller is supported so that the edges of the ribs sweep along the surface of the belt.

An early example of belt cleaner is described in U.S. Pat. No. 2,652,920. There, a rotor that has rubber belt-cleaning blades is supported for rotation on a pair of pivoted arms. The rotor's axis is fixed, and the arms are adjustable. While not stated, the rubber blades can yield to accommodate thickened portions of the belt such as the splice that forms the belt into an endless loop.

Rollers having ribs of hard material are more effective as cleaners; the ribs act like scrapers. U.S. Pat. No. 3,583,555 describes a belt cleaner having a ribbed cleaning roller of hard material. The roller is supported on a pair of pivoted arms and the arms are spring-biased so that the roller's axis is movable toward and away from the conveyor belt. The mean position of the roller is maintained by a balance of opposite-acting pairs of springs. One of the roller-supporting arms carries a motor-and-belt drive. The roller and the motor have substantial weight. In that construction, the roller is prone to bounce entirely away from the belt when local thickening of the belt is encountered. Moreover, because the roller is spring-biased to a neutral position, the effectiveness of the ribs as scrapers is inherently limited. Only a weak spring force can be allowed to hold the ribs of the roller in position to sweep along and clean the belt's surface. If the adjustment were to maintain firm force to the roller holding the ribs firmly against the belt, the cleaning would be effective but the ribs would wear away rapidly.

U.S. Pat. No. 5,161,666 describes another belt cleaner having a ribbed roller supported by springs that balance the weight of the roller and its drive, the whole being adjustable so that the ribs can sweep along the belt surface. If the roller were biased firmly against the belt, the ribs would act more effectively as scrapers. However, the ribs would wear away rapidly, because the ribs are driven at high speed along the belt surface. As in U.S. Pat. No. 3,583,555, the spring bias balances the weight of the roller, the motor, and any other associated weight. In the neutral condition of the springs, there is theoretically no bias restraining the cleaning roller in position for the ribs to sweep along the belt's surface for cleaning the belt.

SUMMARY OF THE INVENTION

The present invention provides belt conveyors with an improved cleaner assembly using a ribbed roller. The novel cleaning roller assembly includes means for supporting the ribbed roller that includes springs for biasing the roller toward the conveyor belt and means for blocking the approach of the roller toward the belt at a definite operating position such that the ribs of the roller sweep along or close to the belt; the roller-supporting means resiliently accommodates forcible deflection of the roller away from the belt. The means for supporting the roller is capable of applying firm, regulated spring pressure that resists deflection of the roller away from the belt when the roller is in its operating position; that condition renders the ribs of the cleaning roller highly effective as scrapers. And yet, the ribs are blocked against bearing forcibly against the belt at any time, thus preventing excessive wear of the ribs.

An adjustment that blocks the roller's motion toward the belt is a separate adjustment that is readily operated to establish the desired proximity of the cleaning ribs to the belt, without affecting a separate adjustment that establishes the desired spring bias of the ribbed roller toward the belt.

As noted above, the usual conveyor belt commonly has a splice, joining the ends of the belt in an endless loop. The splice represents local thickening of the belt; other local thickening of the belt may occur. The resilience of the springs accommodates shift of the cleaning roller as the thickening passes the cleaning roller. The spring bias provides firm yet yielding support for maintaining the roller in optimal relationship to the belt's surface.

The splice often extends at a slant angle across the belt. One consequence of the slant splice is that, as the belt advances, one end of the roller is deflected first, and then the opposite end of the roller is deflected. The roller tilts under these conditions. Additionally, the frame plates at the ends of the cleaning roller assembly, when installed in the belt conveyor, may cause the bearings at the ends of the cleaning roller to be misaligned, relative to the belt's surface. The firm bias applied to the ends of the roller could create a problem, but the roller is here provided with composite spherical and rotary bearings that accommodate tilting of the cleaning roller.

In the exemplary apparatus, the cleaning roller is supported between two frame plates that are fixed to the frame structure of the conveyor belt. When the roller becomes worn excessively, it must be replaced. Removal of the worn roller and installation of a new roller is facilitated by provision of a hole in one or both of the frame plates large enough to pass the roller lengthwise.

The nature of the invention and its advantages will be better understood and appreciated from a review of the following detailed description of two illustrative embodiments that are shown in the accompanying drawings.

BRIEF DESCRIPTION OF THE DRAWINGS

The presently preferred embodiment of the invention is shown in FIGS. 1-5. In FIGS. 1 to 5, conveyor belt 10 is tensioned around substantially half of a belt-supporting roller 12. Bearing 14 supports one end of roller 12 on a portion of frame structure 16. Roller 12 may be a driven roller (the drive not being shown) or the conveyor belt may be driven by another roller around which the belt is tensioned; such other roller, and roller drive means, are omitted from the drawing. A guide roller 18—acting with roller 12—determines the position of segment 10a of the belt between guide roller 18 and belt-supporting roller 12. Belt 10 typically is a tough, relatively thick (e.g. ½" to 1") band of fabric-reinforced rubber, formed into a loop by a diagonal splice (not shown).

Figure 1:
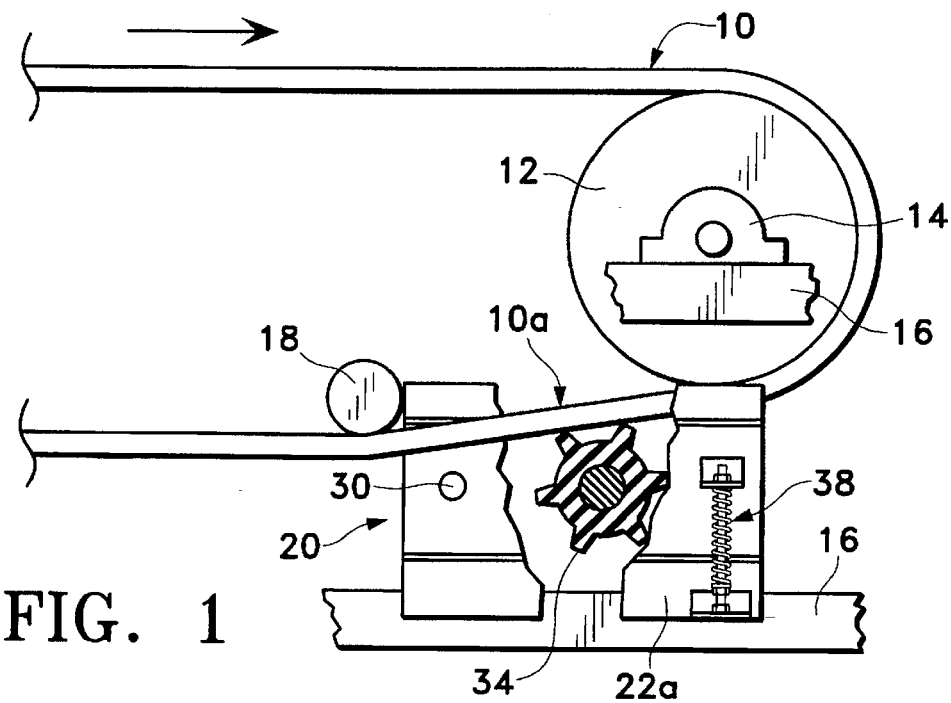
FIG. 1 is a side view of part of a belt conveyor, together with a novel cleaning roller assembly.

Cleaning roller assembly 20 includes frame plates 22a and 22b which are secured to the diagrammatically represented structural frame 16 of the belt conveyor. Bearing plates 28a and 28b slide against the outer sides of frame plates 22a and 22b, respectively. A pivot assembly 30 constrains bearing plate 28a to sweep across the outer surface of frame plate 22a. Correspondingly, a second pivot assembly (not shown) like pivot assembly 30 and coaxial therewith constrains bearing plate 28b to sweep across the outer surface of frame plate 22b. A motor 24 coaxial with roller 34 is secured to a support 28c that is fixed to bearing plate 28b. A coupling inside housing 26 connects motor 24 to cleaning roller 34.

Figure 4:
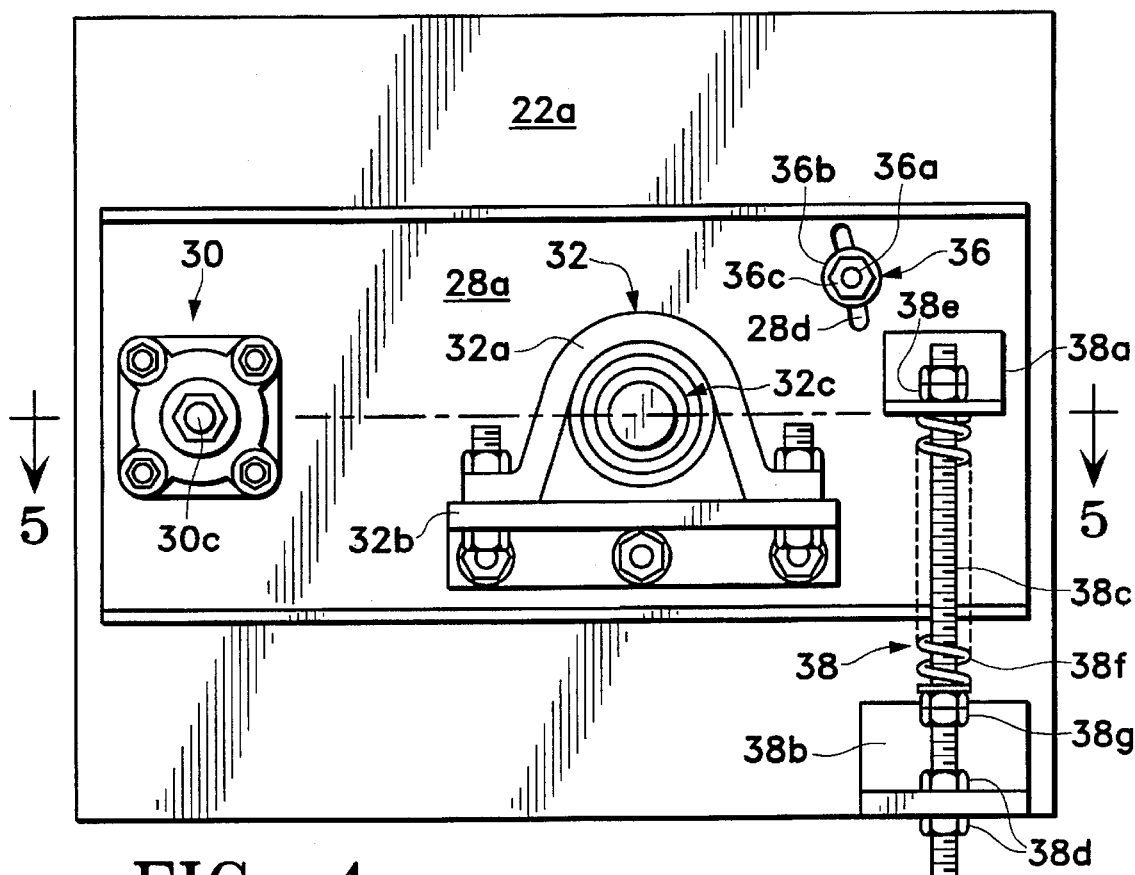
FIG. 4 is an end view of the cleaning roller assembly of FIGS. 1 and 2, seen from the left of FIG. 2.
Figure 5:
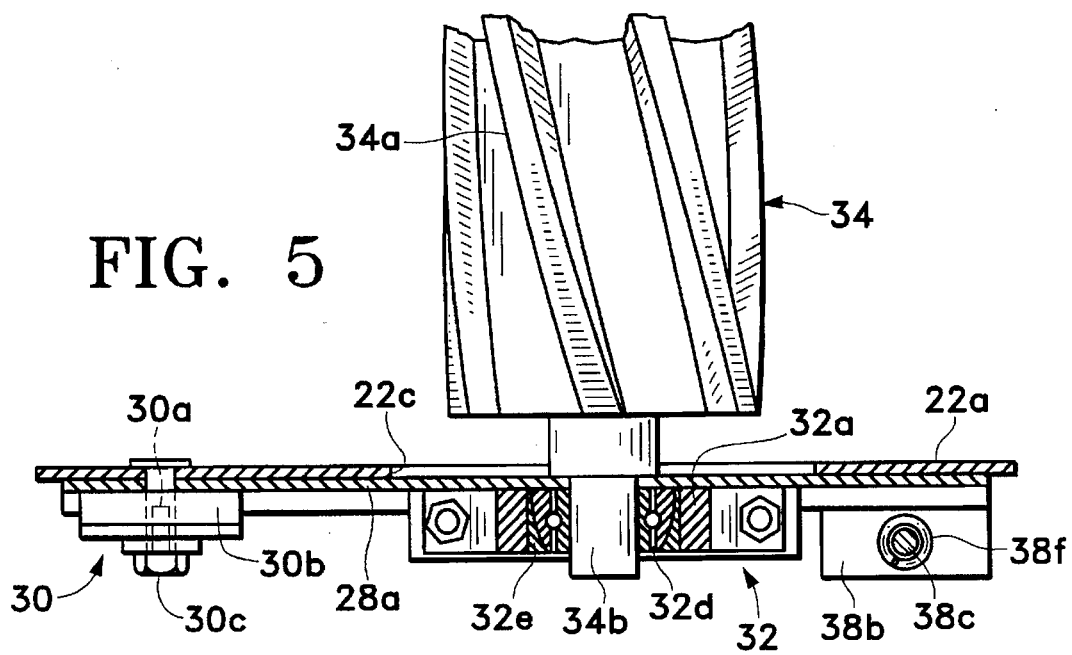
FIG. 5 is a horizontal cross-section of the cleaning roller assembly of FIGS. 1-3, as seen from the section line 5—5 in FIG. 4.

As best seen in FIGS. 4 and 5, pivotal bearing assembly 30 includes a stub shaft 30a that is welded to frame plate 22a; bearing assembly 30 also includes a bearing 30b part of which is fixed to bearing plate 28a; and the bearing assembly 30 also includes a bolt-and-washer assembly 30c for securing bearing plate 28a and part of pivotal bearing 30b to frame plate 22a. A sheet of dry lubricant (not shown) is interposed between plates 22a and 28a, which slide across each other. A mirror-image of bearing assembly 30 and bearing plate 28b are correspondingly provided at the remote side of frame plate 22b. Bearing assembly 30 and its mirror-image bearing assembly have a common axis.

Figure 2:
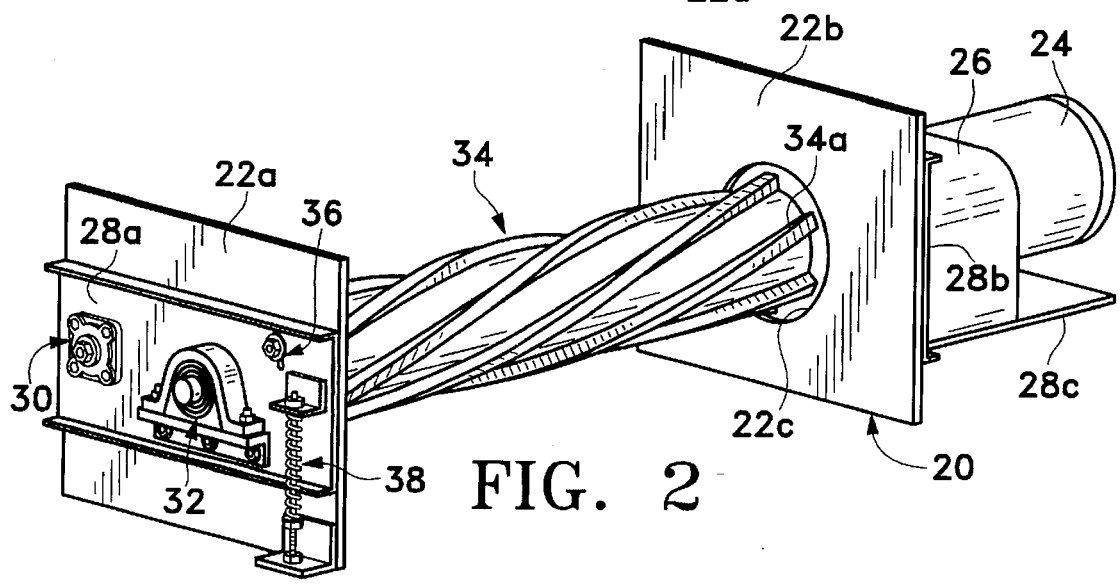
FIG. 2 is the cleaning roller assembly of FIG. 1 in perspective, drawn to a larger scale than FIG. 1.
Figure 3:
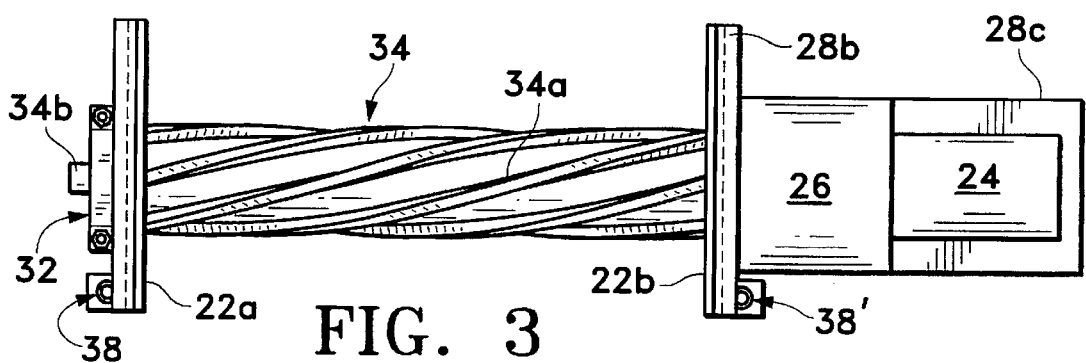
FIG. 3 is a top plan view of the roller assembly of FIG. 2.

A bearing 32 on bearing plate 28a supports one end of cleaning roller 34 and a corresponding bearing plate and a bearing (not shown) at the remote frame plate 22b supports the opposite end of the cleaning roller. Cleaning roller 34 is firmly located opposite to segment 10a of the belt, between rollers 12 and 18 of the belt conveyor. A bearing 32 at one end of roller 34 includes a bearing block 32a supported by and bolted to a bracket 32b, in turn bolted to bearing plate 28a. A spherical bearing 32c supports an end of shaft 34b that projects through plates 22a and 28. Spherical bearing 32c may be a composite bearing, for example, including a conventional rotary bearing 32d of the ball-bearing type or the roller bearing type; and the outer race of that rotary bearing, for example, has a convex spherical contour to bear against a complementary spherically contoured ring 32e. A composite bearing (not shown) duplicating bearing 32 is fixed to bearing plate 28b and supports the end of roller 34 at the right in FIGS. 2 and 3.

Roller 34 itself is a relatively massive, heavy unit, and it is subjected to huge stresses in operation. The roller comprises a hard helically ribbed roller as of polyurethane on a steel shaft. The spherical bearings ordinarily support shaft segments 34b that project at the ends of cleaning roller 34 so that the axis of the roller is positioned perpendicular to mountain plates 22a and 22b, and perpendicular to bearing plates 28a and 28b. However, depending on various conditions, the axis of cleaning roller 34 may become somewhat tilted or skewed. The described spherical bearings accommodate that skewing.

The tops of bearing plates 28a and 28b tend to tilt outward. A guide assembly 36 above the horizontally aligned centers of bearings 30 and 32 retains bearing plate 28a so as to maintain the sliding relationship of bearing plate 28a relative to the frame plate 22a; and a like guide assembly (not shown) maintains the sliding relationship of frame plate 22b and the bearing plate 28b outside frame plate 22b; the bearing plates pivot about their bearings 30. Guide assembly 36 comprises a stub shaft 36a welded to frame plate 22a, washer 36b and a nut 36c on the stub shaft. Slot 28d in bearing plate 28a is a circular arc centered at stub shaft 30a.

Resiliently yieldable supporting means 38 is adjustable for regulating the spring bias that presses the roller close to the surface of belt 10 that is to be cleaned. Supporting means 38 provides firm but yielding support that resists deflection of the roller away from the belt while positively blocking the roller against moving closer toward the belt than its operating position. At that position, the ribs of the cleaning roller sweep along, or close to, the surface of the belt. As essentially duplicate supporting means 38' provides yielding support for the end of roller 34 at the right in FIGS. 2 and 3 and for counterbalancing the weight of the motor; and supporting means 38' also blocks the approach of the cleaning roller closer to the belt than its operating position. Optimally, the ribs do not bear against the belt but are quite close to the surface of the belt.

Supporting means 38 includes two brackets 38a and 38b, fixed to plates 28a and 22a, respectively. The lowermost end of a long threaded shaft 38c is fixed to bracket 38b by nuts 38d. Relatively long and stiff coil spring 38f along threaded shaft 38c forces bracket 38a against nut and lock-nut combination 38e near the top of shaft 38c; and an adjusting nut and lock-nut pair 38g establishes the position of the lower end of stiff spring 38f. Nuts 38g are adjustable to develop any desired compression in the spring, to support the weight of the roller and other parts carried by bearing plates 28a and 28b, and to provide additional bias of the roller toward the belt. Notably, regardless of the spring adjustment, the spring bias cannot lift the roller above the limiting operative position established by shaft 38c and pairs of nuts 38d and 38e. That limiting adjustment should be such that the ribs of the roller just touch the belt or barely clear the belt.

When cleaning roller 34 is deflected downward, as by dirt, bearing plate 28a is deflected downward. A space develops between nuts 38e and bracket 38a; the full force of spring 38f—unrestrained by nuts 38e—becomes effective immediately to resist deflection of ribs 34a away from the belt. During such downward deflection of roller 34, the upward forces of spring 38f and of its counterpart at the opposite end of the roller is maintained; it increases only moderately.

When a thickened area of the belt passes the cleaning roller, it may be noted that bearing plate 28a or 28b, or both plates, move downward in a small stroke about respective pivots 30. As a fine point, it may be noted that bracket(s) 38a move through a short arcuate stroke, which entails a still smaller horizontal component of motion. Shaft 38c extends through a hole (not shown) in bracket 38a. If (as shown) shaft 38c remains vertical, the hole in each bracket 38a should be large enough (or ovate) as may be needed to accommodate that small horizontal component of motion. As an alternative expedient for accommodating the arcuate movement of bracket(s) 38a, bracket(s) 38b may be mounted so as to pivot about an axis perpendicular to frame plates 28a and 28b.

Supporting means 38 for bearing plate 28a is actually a composite of two adjustments. One adjustment limits the movement of the roller toward the belt, but it does not restrain the roller against moving away from the belt. That adjustment is varied so that the roller's ribs touch or barely clear the belt, for achieving greatest scraping effectiveness. The second adjustment makes it possible to regulate the compression of the spring without changing the limit of movement of the roller toward the belt. The compression might be set at a value just enough to support the roller and its driver with the ribs at the desired limiting position. However, the separate adjustment makes it possible to establish greater compression and, consequently, firmer pre-biased support of the roller with its ribs at or close to the belt. Cleaning of the belt is improved by firm yet resilient support of the roller, with the roller blocked against moving toward the belt closer than the limiting position.

Since it is customary to drive the cleaning roller so that the ribs sweep at high speed compared to the surface speed of the belt, the ribs would ware away quickly if they were pressed firmly against the belt. Rapid, wasteful wear would continue until the ribs just touch the belt.

Purely hypothetically, the axis of a cleaning roller might be fixed and adjusted so that the ribs are firmly supported as they sweep along the belt's surface. The ribs would then be most effective as scrapers. However, if the cleaning roller's axis were fixed, local thickening of the belt (e.g., a splice) would not be accommodated. For providing such accommodation, it has been customary to support the bearing at each end of a ribbed cleaning roller in an neutral position by pairs of oppositely acting springs. That apparatus is adjusted so that the ribs of the cleaning rollers just touch and sweep across the surface of the belt in that "neutral" or balanced condition of the springs. The roller can be deflected from that condition to accommodate local thickening of the belt. Here, supports 38 and 38' at the opposite-end bearing plates 28a and 28b are yieldable to accommodate belt thickening, yet the support for the cleaning roller is resilient but firm in the adjusted condition of supports 38 and 38'.

The dual adjustments described above make possible both (1) the adjustment of the roller's approach to the belt so that its ribs barely touch the belt, and (2) the adjustment of the roller-biasing springs so as to provide firm positioning of the roller, with one-way resilience. Greater spring force is developed holding the roller in its optimal cleaning position than is developed by springs arranged for merely balancing the weight of the roller and its drive. Firm but resilient support of the roller results in improved effectiveness of the ribs for cleaning the belt, without causing unnecessary wear of the ribs.

In most effective use of the apparatus of FIGS. 1–5, the outer edges of the ribs 34a of the cleaning roller 34 touch but do not bear against the conveyor belt 10. The conveyor belt is typically driven at a surface speed of 30, 40 or even 60 feet per minute. The cleaning roller is driven at a high rate so that the outer edges of ribs 34a have a much higher surface speed than the belt, e.g. three to four times the speed of the conveyor belt. If the spring supports 38 at the opposite ends of roller 34 were adjusted to force the cleaning roller against the conveyor belt, the ribs of the cleaning roller would ware down quickly. This excessive, wasteful wear of the ribs would continue until the ribs just touch but do not bear against the belt. The cleaning roller should be biased upwardly and forcefully to its operating position limited by the adjustment of nuts 38d such that the ribs 34a sweep along or close to the belt. Excessive wear of the ribs is avoided and the pressure of the springs maintains the cleaning roller firmly in that condition for effective scraping of the belt. The spring bias more-than-balances the weight of the massive roller and its drive means; with the roller blocked against bearing forcefully against the belt, the spring bias still provides affirmative pressure holding the roller firmly against displacement away from its optimal cleaning position.

The cleaning roller is allowed to shift downward when forced to do so. That may be caused by an overlap splice of the belt.

A localized condition such as belt thickening may cause a sudden down-swing of the cleaning roller away from the belt. Because of the stiff springs 38f, the cleaning roller does not over-travel downward so as to swing away from the belt. The firmness of the springs avoids any prominent behavior of that kind. After a belt-thickening condition has passed, the cleaning roller resumes its optimal adjusted position close to the belt without pressing the ribs against the belt. The roller is then in its operating position, with its ribs sweeping along or close to the belt. To best advantage, the springs provide a definite amount of upward bias, firmly keeping the roller up to a limiting position (the "operating position") established by nuts 38d and 38e and threaded shaft 38c. In this firmly biased condition of the roller, the ribs act as efficient scrapers.

Even if the springs were adjusted so that the roller is biased upward barely enough to hold the roller in position with its ribs sweeping along or close to the belt, the described adjustable spring suspension has distinctive merit. The roller is supported yieldably, allowing it to be deflected away from the stop, but the roller's ribs cannot bear against the belt under any circumstances. However, as already noted, it is considered ideal for firm bias to be applied urging the roller's bearing means upward to the operating point and blocked there, at the point where the ribs just clear the belt; the ribs are then highly effective as scrapers for cleaning the belt.

The lower end of threaded shaft 38c may be fixed permanently to bracket 38b, by means of lock unit 38d or otherwise. Nuts 38e may then be used for limiting the shift of the cleaning roller upward, precisely to its operating position. Deflection of the roller downward is not blocked; deflection of the cleaning roller to accommodate thickening of the belt is allowed. Nuts 38g may be adjusted, separately, to compress spring 38f to a specific length. This biases the roller upward. When adjustment of the cleaning roller becomes necessary, for compensating for wear of the cleaning ribs, both pairs of nuts 38e and 38g are adjusted, first nuts 38e and then nuts 38g.

The splice that joins the ends of the belt to form a loop may extend directly across the belt, as in some mechanical splices. The splice may otherwise extend at a slant angle across the belt; the splice involves local thickening, when it involves overlap and vulcanization. Thickening of the belt due to a slant overlap splice first passes one end of the cleaning roller, then the opposite end of the splice passes the roller. Each biasing support 38, 38', acting at its end of the cleaning roller yields at different times, as required, first at one end and then at the opposite end; the axis of the cleaning roller is forced to tilt somewhat. The spherical bearings 32c at the ends of the cleaning roller accommodate tilting of the cleaning roller, without binding, whether due to belt thickening or other causes.

The cleaning roller may be rotated in either direction, clockwise or counter-clockwise, the tabs moving in the same direction as the belt or in the opposite direction, as desired. Particles of the material that cling to the return stretch of the conveyor belt are impelled away from the belt at high speed. A collecting tray or a chute (not shown) may be arranged to collect the cleaned-away debris.

It is necessary to replace the cleaning roller when it has become worn excessively. When replacing a cleaning roller, it is only necessary to remove a bearing plate 28 at one end of the cleaning roller assembly. One frame plate 22a or 22b, or both, have holes 22c (FIGS. 2 and 5) large enough to accommodate endwise removal and replacement of the cleaning roller. These frame plates can remain fixed to the conveyor's frame 16 when the roller is being replaced.

Figure 6:
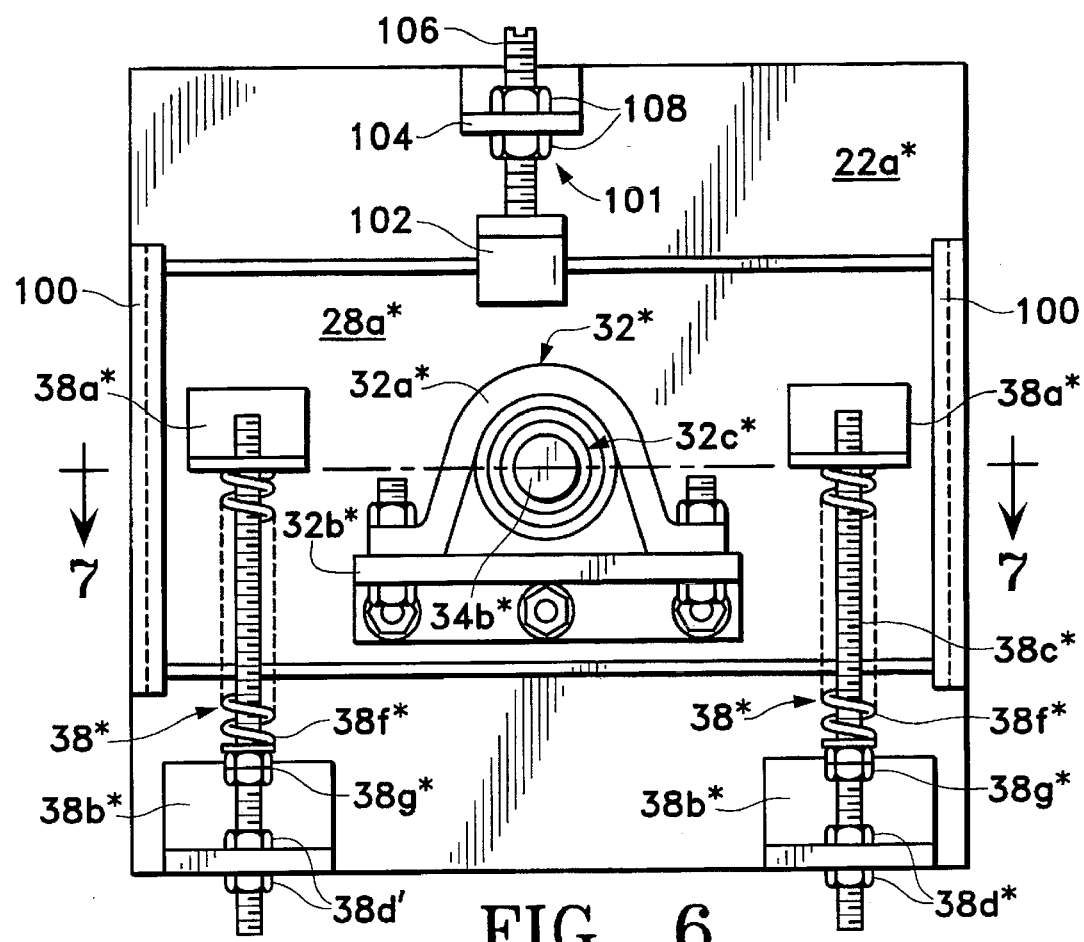
FIG. 6 is an end view of a modification of the cleaning roller assembly shown in FIG. 4.
Figure 7:
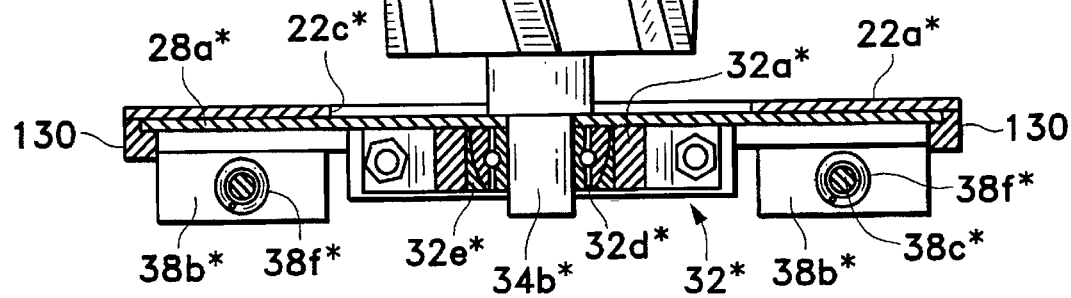
FIG. 7 is a horizontal cross-section of the modified cleaning roller assembly of FIG. 6, seen at line 7—7 in FIG. 6.

The illustrative embodiment of the invention in its varied aspects as seen in FIGS. 1–5, has proved to be quite successful; it represents the presently preferred construction. However, a range of modification and rearrangement may be adopted without departing from certain aspects of the invention. FIGS. 6 and 7 represent a modification of portions of the mechanism of FIGS. 1–5. In these Figures, numerals have asterisks designate elements that are the same as like-numbered elements in FIGS. 1–5. Accordingly, further description of such elements and their relationships is omitted, for conciseness.

The embodiment of FIGS. 6 and 7 replaces pivotal support of bearing plates 28a and 28b by straight-line motion of bearing plate 28a* and of a bearing-support plate (corresponding to plate 28b) at the opposite end of the structure that supports the cleaning roller. Rails 100 fixed to frame plate 22a* ensure sliding motion of bearing plate 28a*, and the rails restrain plate 28a* against tilting away from plate 22a*.

Nuts 38a of FIGS. 4 and 5 limit the upward movement of bearing plate 28a, blocking movement of the cleaning roller toward the conveyor belt. (See FIG. 1.) In FIGS. 6 and 7, the upward movement of bearing plate 28a* is limited to an adjusted position by blocking means 101, adjusted so that the ribs of the cleaning roller sweep along the belt's surface. Plate 28a* is firmly biased upward by a pair of springs 38f* whose compression is rendered adjustable by nuts 38g*. A bracket 102 is welded to bearing plate 28a*; another bracket 104 is welded to frame plate 22a*. Bolt 106 is adjustably fixed to bracket 104 by lock nuts 108. Springs 38c* bias bracket 102 against the lower end of bolt 106. Accordingly, the full force of springs 38c* is available to bias the cleaning roller to its operating position, with the cleaning ribs sweeping along the belt's surface. Blocking means 101 prevents the cleaning ribs from being spring-pressed against the cleaning belt. If dirt adherent on the belt should tend to deflect the cleaning roller 34 downward, thereby shifting bracket 102 even slightly away from belt 106, the full force of springs 38c* is effective immediately to provide firm support of the cleaning roller, thereby to assure optimal scraping operation of the cleaning ribs.

The mechanism of FIGS. 6 and 7—in common with the mechanism of FIGS. 4 and 5—provides support for the cleaning roller in which the roller is prevented from bearing forcibly against the belt, while accommodating forced deflection of the cleaning roller away from its normal operating position, in which the ribs sweep along the belt's surface. In common with the embodiment of FIGS. 1–5, the mechanism of FIGS. 6 and 7 provides separate adjustments for the cleaning roller (1) for limiting movement of the cleaning roller toward the belt, and (2) for adjusting the compression of springs 38f* when upward shift of the cleaning roller is limited by blocking means 101.

The exemplary embodiment of the invention and the modification described in detail above are susceptible to numerous modifications, as is readily apparent. Consequently, the invention should be construed broadly in accordance with its true spirit and scope.

I claim:
1. The combination of
   A. a conveyor including a belt having a material-conveying stretch and a return stretch that has a surface to be cleaned, and
   B. a belt-cleaning assembly mounted opposite to said surface, said assembly including
      i. a rotatable cleaning roller having an elongated body and spaced-apart ends and having multiple elongated cleaning ribs extending fixedly from said body and outward therefrom, said ribs being distributed at arcuate intervals about the body and arranged for scraping debris from the belt during rotation of the roller,
      ii. drive means for turning said roller rapidly and thereby causing said ribs, in succession, to perform belt-cleaning sweeps at high speed relative to the speed of said surface to be cleaned,
      iii. supporting means for supporting said cleaning roller so as to be movable toward and away from said surface to be cleaned,
      iv. means acting on said supporting means for biasing the roller toward said surface to be cleaned, and
      v. blocking means cooperating with said supporting means for arresting said roller against bias-induced movement toward said surface closer than a limiting position wherein said ribs sweep along paths at least close to said surface to be cleaned, said blocking means and said biasing means accommodating movement of the roller away from said limiting position.

2. The combination as in claim 1, wherein said blocking means is adjustable to modify said limiting position of the roller for multiple purposes including for establishing a desired degree of proximity of the roller's ribs to the belt and for enabling said desired proximity to be maintained to compensate for wear of the ribs.

3. The combination as in claim 1, further including means for adjusting the means for biasing the roller so as to adjust the bias of the roller toward the surface to be cleaned when the roller is arrested by said blocking means.

4. The combination as in claim 3, wherein said blocking means for arresting the movement of the cleaning roller closer to said surface of the belt than said limiting position includes adjusting means, separate from said means for adjusting said means for biasing the roller.

5. The combination as in claim 1, wherein said conveyor has a frame and said cleaning assembly has a pair of frame plates fixed to said frame at the opposite ends of said roller, at least one of said frame plates having a hole large enough for lengthwise insertion and removal of said cleaning roller.

6. The combination as in claim 1, including a motor for driving the roller, said motor being carried by said supporting means, wherein said surface to be cleaned faces downward, and wherein said biasing means not only biases the roller upward so as to be arrested by said blocking means but also counter-balances any weight carried by said supporting means, including the weight of said roller and its driving motor.

7. Cleaning apparatus for assembly to a conveyor belt for cleaning a surface of the belt, said apparatus including
   i. a rotatable cleaning roller having an elongated body and spaced-apart ends and having multiple elongated cleaning ribs extending fixedly from said body, said ribs being distributed at arcuate intervals about the body and extending outward therefrom and arranged for scraping debris from the belt during rotation of the roller, ii. drive means for turning said roller rapidly and thereby causing said ribs, in succession, to perform belt-cleaning sweeps at high speed relative to the speed of the surface to be cleaned, iii. supporting means for supporting said cleaning roller so as to be movable toward and away from the surface to be cleaned, iv. means for biasing the roller in a first direction, being toward said surface to be cleaned, when the cleaning apparatus is assembled to the conveyor belt, and v. blocking means cooperating with said supporting means for arresting said roller against bias-induced movement toward said surface closer than a limiting position wherein said ribs sweep along paths at least close to said surface to be cleaned, said blocking means and said biasing means accommodating movement of the roller in a second direction, being opposite to said first direction.

8. Cleaning apparatus as in claim 7, wherein said blocking means is adjustable for varying said limiting position of the roller so that, when the apparatus is assembled to a conveyor belt, an effective cleaning relationship of the cleaning roller's ribs to the conveyor belt may be maintained despite wearing down of said ribs.

9. Cleaning apparatus as in claim 7, wherein said biasing means is adjustable for variably forcing the cleaning roller's supporting means against the blocking means.

10. Cleaning apparatus as in claim 9, wherein said blocking means includes means for adjusting the limiting position of the cleaning roller independently of said means for varying the force of the cleaning roller's supporting means against the blocking means.

11. Cleaning apparatus as in claim 7, wherein when the apparatus is assembled to a conveyor belt, said biasing means acts in an upward direction to apply bias in said first direction for at least counterbalancing the weight of the cleaning roller and any other weight carried by said cleaning roller supporting means.

12. Cleaning apparatus as in claim 11, wherein said cleaning roller drive means is carried by the cleaning roller supporting means, the weight of said drive means being counterbalanced by said biasing means.

13. Cleaning apparatus as in claim 7, wherein said supporting means includes a pair of frame plates at the opposite ends of the cleaning roller, at least one of said frame plates having a hole large enough for lengthwise insertion and removal of the cleaning roller.

14. The method of cleaning the return stretch of a conveyor belt using a cleaning roller having ribs, including the steps of turning the cleaning roller at a rate such that the ribs sweep rapidly along the belt, blocking the cleaning roller against moving toward the belt closer than a limiting position at which the ribs sweep at least close to the belt, and biasing the cleaning roller toward the belt for firmly resisting displacement of the cleaning roller away from the belt while the cleaning roller is in said position.

15. The combination of

A. a conveyor including a belt having a material-conveying stretch and a return stretch that has a surface to be cleaned, and B. a belt-cleaning assembly mounted opposite to said surface, said assembly including i. a rotatable cleaning roller having an elongated body and spaced-apart ends and having multiple elongated cleaning ribs extending fixedly from said body and outward therefrom, said ribs being distributed at arcuate intervals about the body and arranged for scraping debris from the belt during rotation of the roller, ii. drive means for turning said roller rapidly and thereby causing said ribs, in succession, to perform belt-cleaning sweeps at high speed relative to the speed of said surface to be cleaned, iii. supporting means for separately supporting each end of said cleaning roller so as to be movable toward and away from said surface to be cleaned, iv. means for biasing each end of the roller toward said surface to be cleaned, and v. dual blocking means cooperating with said supporting means of each end of the roller for arresting the respective ends of said roller against bias-induced movement of the ends of the roller toward said surface closer than limiting positions wherein said ribs sweep along paths at least close to said surface to be cleaned, said dual blocking means and said biasing means accommodating movement of the roller away from said limiting positions.

16. The combination as in claim 15, wherein said blocking means cooperating with said supporting means of each end of the cleaning roller is separately adjustable to modify said limiting positions of the ends of the roller for multiple purposes including for determining the degree of proximity of the roller's ribs all along the lengths thereof relative to the surface to be cleaned and for enabling said degree of proximity to be maintained for compensating for wear of the ribs.

* * * * *